United States Patent [19]

Matsumoto

[11] Patent Number: 4,938,551
[45] Date of Patent: Jul. 3, 1990

[54] LIGHT-SCANNING READER

[75] Inventor: Yasuo Matsumoto, Shizuoka, Japan

[73] Assignee: Tokyo Electric Company, Ltd., Tokyo, Japan

[21] Appl. No.: 277,312

[22] Filed: Nov. 29, 1988

[30] Foreign Application Priority Data

Dec. 1, 1987 [JP] Japan ............................. 62-303621

[51] Int. Cl.⁵ .............................................. G02B 26/10
[52] U.S. Cl. ...................................... 350/6.7; 350/6.5
[58] Field of Search ................. 350/6.5, 6.6, 6.7, 6.8, 350/6.9, 486

[56] References Cited

FOREIGN PATENT DOCUMENTS 56-21132  5/1981  Japan .
59-132073 7/1984  Japan .
0138917  6/1986  Japan ................... 350/6.7
61-285585 12/1986 Japan .

*Primary Examiner*—Bruce Y. Arnold
*Assistant Examiner*—Ronald M. Kachmarik
*Attorney, Agent, or Firm*—Oblon, Spivak, McClelland, Maier & Neustadt

[57] ABSTRACT

A light-scanning reader equipped with a rotary or oscillatory polyhedral reflector including at least two correlated reflecting surfaces each formed in an angular range of 180° or less to generate a plurality of mutually non-parallel scanning loci. The polyhedral reflector is so disposed as to be rotatable or oscillatable on its axis and is capable of easily generating a plurality of directionally different scanning loci.

8 Claims, 14 Drawing Sheets

TO SCANNING
LOCUS C

LIGHT-SCANNING READER

FIELD OF THE INVENTION AND RELATED ART STATEMENT:

The present invention relates to a light-scanning reader for optically reading bar-code information or the like by deflecting and scanning a light beam emitted from a light source.

The conventional methods of optically reading bar-code information or the like will be described below with reference to some specific examples known heretofore. In a first example illustrated in FIG. 22, a light beam 2 emitted from a light source 1 is irradiated to reflecting surfaces 5 of a rotary polyhedral mirror 4 rotatable by means of a motor 3, so that a single scanning locus 6 can be repeatedly generated six times, which correspond to the number of such reflecting surfaces 5, per rotation of the polyhedral mirror 4. The apparatus based on such technique is capable of reading the information of a bar code 7 when it is placed on the scanning locus 6.

In a second conventional example, an oscillatory mirror 8 is employed as illustrated in FIG. 23. According to this example, a light beam 2 from a light source 1 is irradiated to the oscillatory mirror 8 which is oscillatable by means of an actuator 9, so that a single scanning locus 6 is generated repeatedly and therefore bar-code information can be read in the same manner as in the first example.

Regarding a third conventional example, there is known the apparatus disclosed in Japanese Patent Laid-open No. 59 (1984)-132073. According to this technique, as illustrated in FIG. 24, a light beam 2 emitted from a light source 1 is reflected by reflecting surfaces 11 of a rotary polyhedral mirror 10 which is rotatable by means of a motor 3, so that a plurality of scanning loci 12 are generated. In this structure, as shown in FIG. 25 (*a*) through (*f*), six reflecting surfaces 11 are so formed as to individually have inclination angles $\theta 1$ through $\theta 6$ which are slightly changed in sequence with respect to the rotation axis P of the rotary polyhedral mirror 10, whereby the scanning loci 12 are rendered mutually parallel while being spaced apart from one another.

Due to such generation of a plurality of scanning loci 12 as mentioned, it becomes possible to read the bar-code information properly despite the existence of some vertical positional deviation of the bar code 7 if the bar code is placed on any one of such scanning loci 12.

As a fourth conventional example, there is known the apparatus disclosed in Japanese Patent Publication No. 56 (1981)-21132. According to this example, as illustrated in FIG. 26, a light beam 2 emitted from a light source 1 (laser beam generator) is reflected and deflected by a rotary reflector 14 rotatable in a stationary mirror group 13, and then is further reflected by a plurality of stationary mirrors 15 to consequently generate a radial scanning locus group 16.

Therefore, if a bar code 7 is placed at the position of such scanning locus group 16, the bar-code information can be read properly regardless of the direction of the bar code 7.

However, in each of the first and second conventional examples where a reading operation is performed by the use of a single scanning locus 6, the bar-code information fails to be read in case the position of the bar code 7 has a vertical deviation from the scanning locus 6 or the plane of the bar code 7 is inclined and not parallel with the scanning locus 6, whereby considerable restriction is induced with respect to the reading position and direction.

Meanwhile in the third conventional example where a reading operation is performed with a plurality of parallel scanning loci 12 instead of a single scanning locus, the positional restriction is alleviated in reading the bar code 7 vertical to the scanning loci 12. However, since such plurality of scanning loci 12 are entirely parallel with the surface of the bar code 7, reading the bar-code information is rendered impossible, as in the first and second examples, if the surface of the bar code 7 is inclined to the scanning loci 12 and not parallel therewith.

And in the fourth conventional example where the bar code 7 placed in any direction is read by the use of a radial scanning locus group 16, there exists a problem that, although the positional and directional restrictions in reading the code can be alleviated, the number of required component parts is increased due to the necessity of a stationary mirror group 13 inclusive of rotary mirrors 14 and so forth to eventually render the whole apparatus structure greater, hence complicating the adjustment as a result.

OBJECTS AND SUMMARY OF THE INVENTION:

It is a first object of the present invention to perform an exact operation of reading bar-code information.

A second object of the present invention resides in generating a plurality of scanning loci which are directionally different from one another.

A third object of the present invention is to generate a plurality of directionally different scanning loci in a simplified structure without using a group of stationary mirrors.

And a fourth object of the present invention is to form the whole apparatus into a lightweight and compact structure.

For the purpose of achieving the objects mentioned, the present invention is equipped with a polyhedral reflector or mirror having at least two correlated reflecting surfaces each formed in an angular range of 180° or less and capable of generating a plurality of mutually non-parallel scanning loci, wherein such reflector is so retained as to be rotatable or oscillatable o its axis.

Therefore, when a light beam emitted from a light source is irradiated to at least two correlated reflecting surfaces of the rotating or oscillating polyhedral reflector each formed in an angular range of 180° or less, radial or meshy scanning loci of the light beam reflected by such surfaces are formed in different directions. Consequently, if the bar code is placed within the group of such scanning loci, it becomes possible to read the bar-code information with simplicity and, due to the nonnecessity of using any stationary mirror group, the entire apparatus can be constructed with a lightweight and compact structure.

Figure 1:
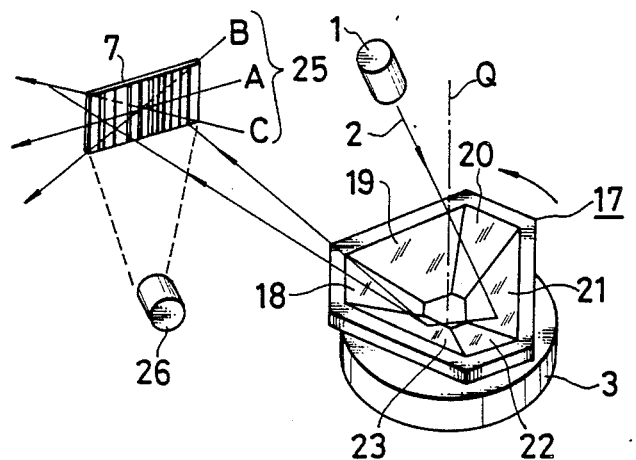
FIG. 1 is a perspective view of a first embodiment according to the present invention.
Figure 2:
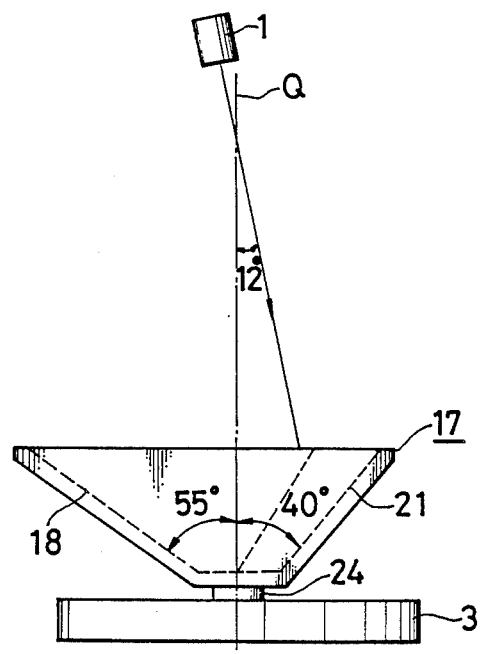
FIG. 2 is a side view of the first embodiment shown in FIG. 1.
Figure 3:
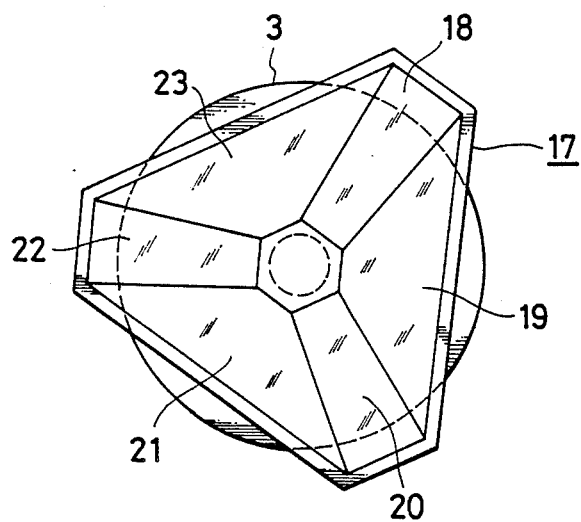
FIG. 3 is a plan view of the first embodiment.

DETAILED DESCRIPTION OF THE PREFERRED EMBODIMENTS:

Hereinafter a first embodiment of the present invention will be described with reference to FIGS. 1 through 10. A rotary polyhedral reflector 17 serving as a polyhedral mirror has six reflecting surfaces 18, 19, 20, 21, 22 and 23 which are disposed correlatively to one another with inclinations to a horizontal plane, and the entirety of such reflector 17 is shaped to be concave. The rotary polyhedral reflector 17 is retained to be rotatable with its bottom 24 anchored onto a motor 3.

Each of the reflecting surfaces 19, 21 and 23 has an inclination angle of 40° to the rotation axis Q of the rotary polyhedral reflector 17, while each of the reflecting surfaces 18, 20 and 22 has an inclination angle of 55° to the rotation axis Q. In this structure, a light beam 2 emitted from a light source 1 is incident upon the reflecting surfaces 18, 19, 20, 21, 22 and 23 at an angle of 12° with the rotation axis Q.

In the above structure, when the light beam 2 from the light source 1 is irradiated to the reflecting surfaces 18, 19, 20, 21, 22 and 23 of the rotary polyhedral reflector 17 rotated by the motor 3, the reflected light forms a radial scanning locus group 25 consisting of scanning loci A, B and C. Therefore, if a bar code 7 is placed at the position of such scanning locus group 25, the bar-code information can be read by receiving the reflected light by means of a photo sensor 26.

Referring now to FIGS. 4 through 10, a description will be given below with regard to the processes of forming the individual scanning loci A, B and C which constitute a radial scanning locus group 25.

Figure 4:
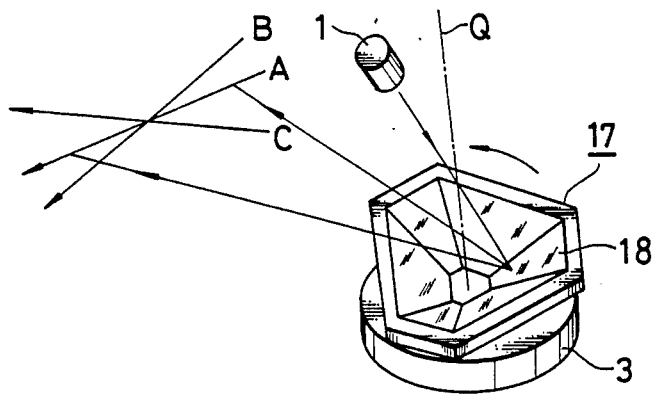
FIGS. 4 through 9 illustrate the processes of forming individual scanning loci A, B and C.
Figure 5:
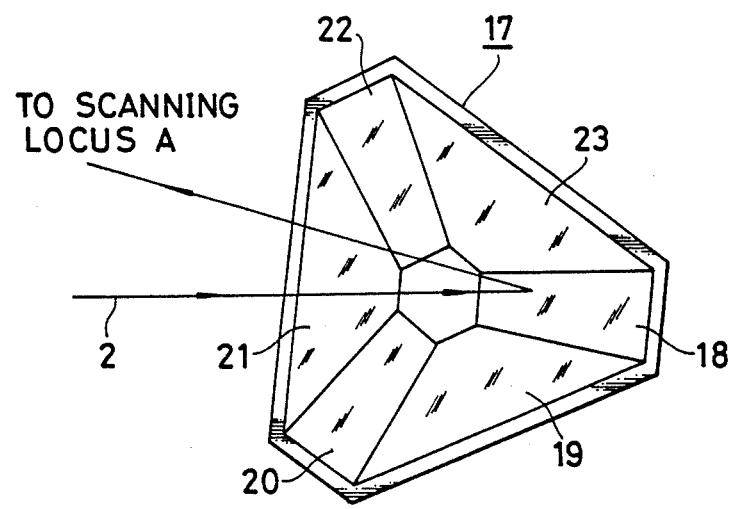

First, when the light beam 2 emitted from the light source 1 is irradiated to the reflecting surface 18 having an inclination angle of 55°, as illustrated in FIGS. 4 and 5, the light beam 2 is reflected to form a scanning locus A. The scanning locus A thus formed by a single reflection is rendered parallel with the reflecting surface 18.

Figure 6:
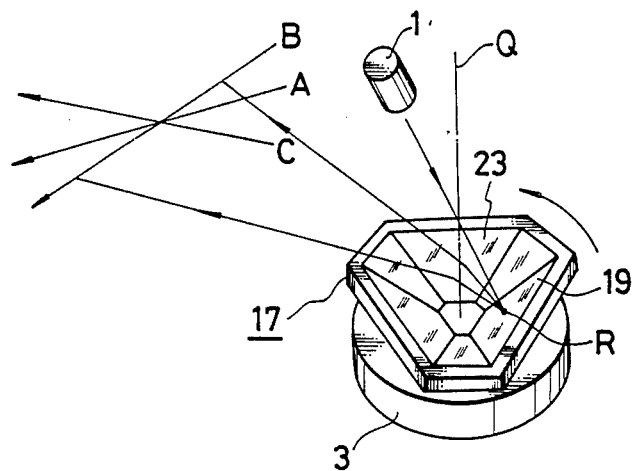
Figure 7:
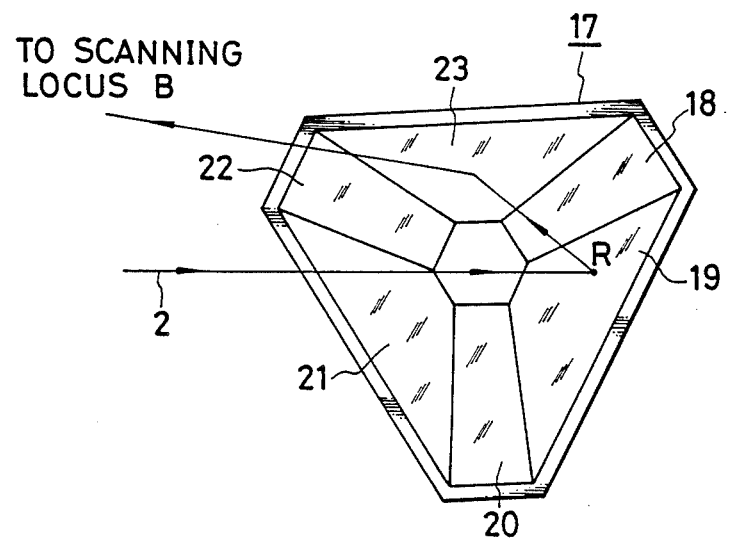

In the next stage as illustrated in FIGS. 6 and 7, when the light beam 2 is irradiated, in accordance with rotation of the polyhedral reflector 17, to a point R on the reflecting surface 19 having an inclination angle of 40°, the light beam 2 reflected first at the point R is then reflected again successively at the surface 23 to form a scanning locus B. The scanning locus B thus formed by two reflections is not parallel with the scanning locus A formed previously by a single reflection and comes to have an inclination to the reflecting surface 19 concerned with the first reflection.

Figure 8:
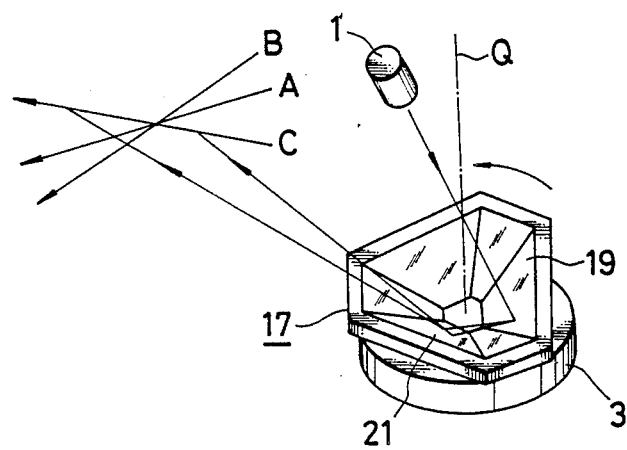
Figure 9:
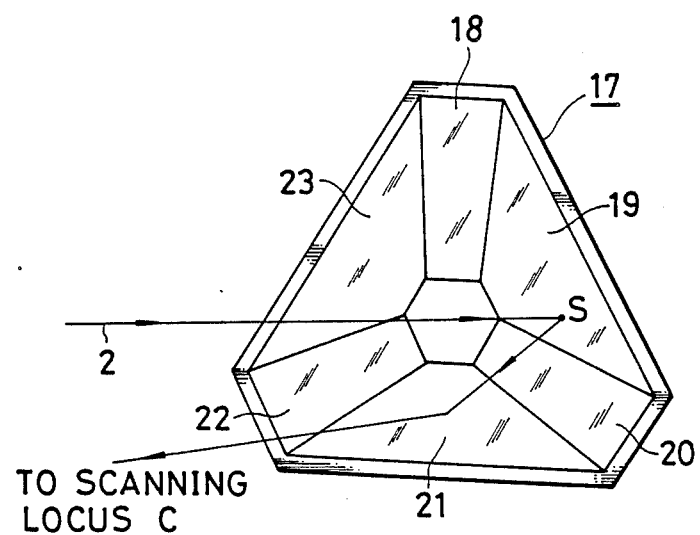

Subsequently as illustrated in FIGS. 8 and 9, when the light beam 2 is shifted to a point S on the reflecting surface 19 in accordance with further rotation of the polyhedral reflector 17, the light beam 2 once reflected at the point S is then reflected again successively at the surface 21 to form a scanning locus C. The scanning locus C thus formed by two reflections is not parallel with the scanning locus A formed by a single reflection and comes to have an inclination to the surface 19 concerned with the first reflection. In this case, the inclination of the scanning locus C becomes directionally inverse to that of the scanning locus B.

In this manner, a radial scanning locus group 25 consisting of scanning loci A, B and C can be formed with every ⅓ rotation of the rotary polyhedral reflector 17, so that when the bar code 7 is placed at the position where such radial scanning locus group 25 is formed, it is possible to read the bar-code information with the photo sensor 26 disposed to receive the reflected light.

Therefore, if the bar code 7 is so placed as to be within the radial scanning group 25 formed in universal directions, the operation of reading the bar-code information can be performed simply with another advantage of eliminating the necessity of a stationary mirror group 13 mentioned previously in connection with the prior art, hence reducing both the dimensions and weight of the whole apparatus structure.

Figure 10:
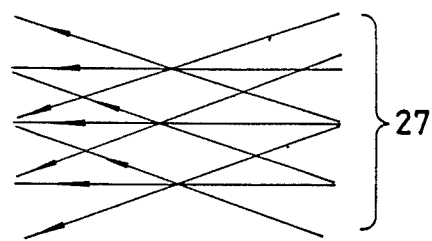
FIG. 10 illustrates meshy scanning loci.

In the embodiment mentioned above, the angle formed by each of the reflecting surfaces 18, 20 and 22 with the rotation axis Q is exactly the same, and also the angle formed by each of the reflecting surfaces 19, 21 and 23 with the rotation axis Q is exactly the same, so that the radial scanning locus group 25 is formed three times repeatedly in accordance with one rotation of the polyhedral reflector 17. In addition, there is contrived another method which forms a meshy scanning locus group 27 per rotation of the polyhedral reflector 17 as illustrated in FIG. 10, wherein the angles formed by the reflecting surfaces 18, 20 and 22 with the rotation axis Q have some differences individually, and also the angles formed by the reflecting surfaces 19, 21 and 23 with the rotation axis Q have some differences individually in a similar manner.

Figure 11:
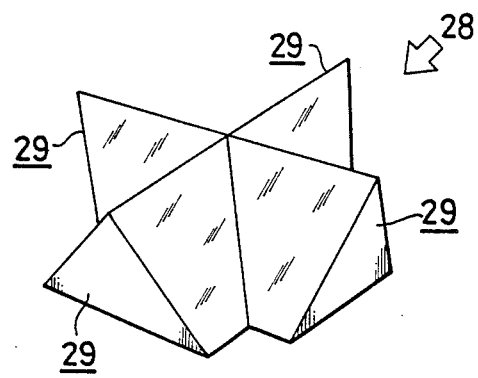
FIG. 11 is a perspective view of a second embodiment according to the present invention.
Figure 12:
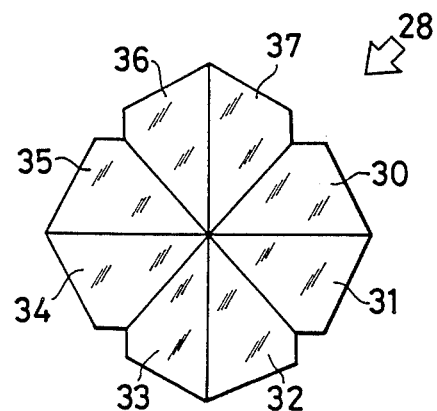
FIG. 12 is a plan view of the second embodiment.
Figure 13:
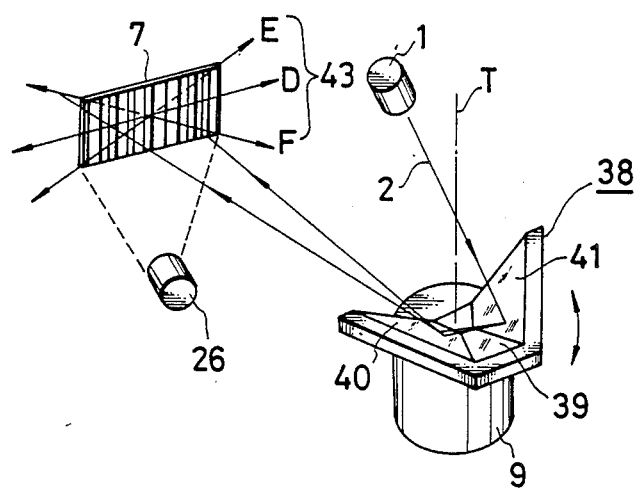
FIG. 13 is a perspective view of a third embodiment according to the present invention.
Figure 14:
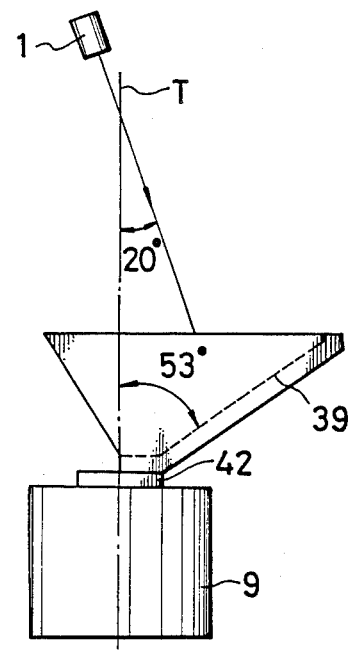
FIG. 14 is a side view of the third embodiment shown in FIG. 13.
Figure 15:
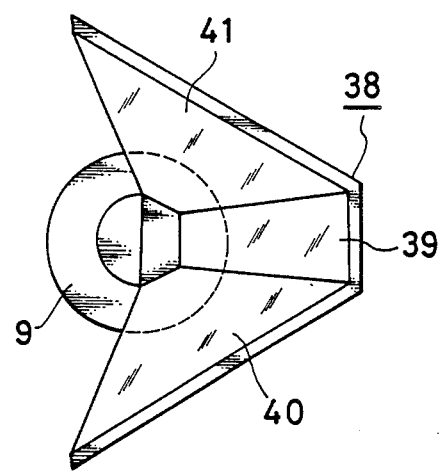
FIG. 15 is a plan view of the third embodiment.

Now a second embodiment of the present invention will be described below with reference to FIGS. 11 and 12. This embodiment is a modification of the aforementioned rotary polyhedral reflector 17 in the first embodiment. A rotary polyhedral reflector 28 serving as a polyhedral mirror has four triangular projections 29 extending in four directions, and the slants of the projections 29 are shaped into a total of eight reflecting surfaces 30, 31, 32, 33, 34, 35, 36 and 37.

In such a structure, a light beam 2 irradiated to any one of the reflecting surfaces 30, 31, 32, 33, 34, 35, 36 and 37 of the rotary polyhedral reflector 28 anchored on an unshown rotating motor is reflected once or twice successively to form a radial or meshy scanning locus group 25 or 27 similarly to the one in the first embodiment. Since the principle and effect of such locus group formation are considered to be the same as those in the foregoing first embodiment, a repeated explanation thereof is omitted here.

Next a third preferred embodiment of the present invention will be described with reference to FIGS. 13 through 21. An oscillatory polyhedral reflector 38 serving as a polyhedral mirror has a reflecting surface 39 in the direction to form an angle of 53° with an oscillation axis T, and also has reflecting surfaces 40 and 41 in the directions to form an angle of 39° with the oscillation axis T. Such three reflecting surfaces 39, 40 and 41 are mutually correlated in arrangement, and the entirety of the reflector 38 is shaped to be concave. This polyhedral reflector 38 is kept oscillatable with its bottom 42 anchored onto an oscillating actuator 9.

In such a structure, when a light beam 2 emitted from a light source 1 is irradiated to the reflecting surfaces 39, 40 and 41 of the oscillatory polyhedral reflector 38 which is oscillated by the actuator 9, the reflected light therefrom forms a radial scanning locus group 43 consisting of a plurality of scanning loci D, E and F. Therefore, if a bar code 7 is placed at the position of such scanning locus group 43, the bar-code information can be read with a photo sensor 26 disposed to receive the reflected light.

Referring now to FIGS. 16 through 21, a description will be given with regard to the processes of forming the individual scanning loci D, E and F which constitute a radial scanning locus group 43.

Figure 16:
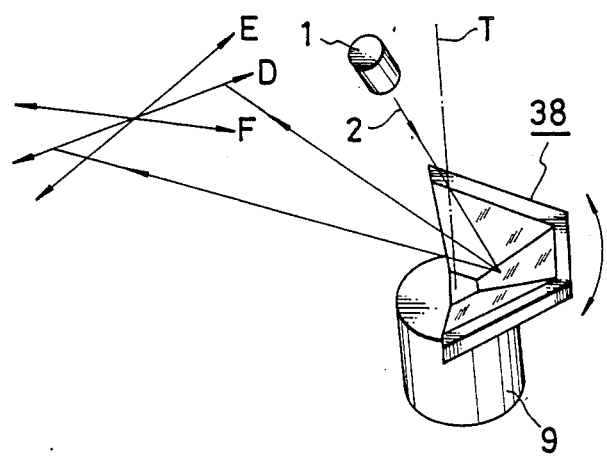
FIGS. 16 through 21 illustrate the processes of forming individual scanning loci D, E and F.
Figure 17:
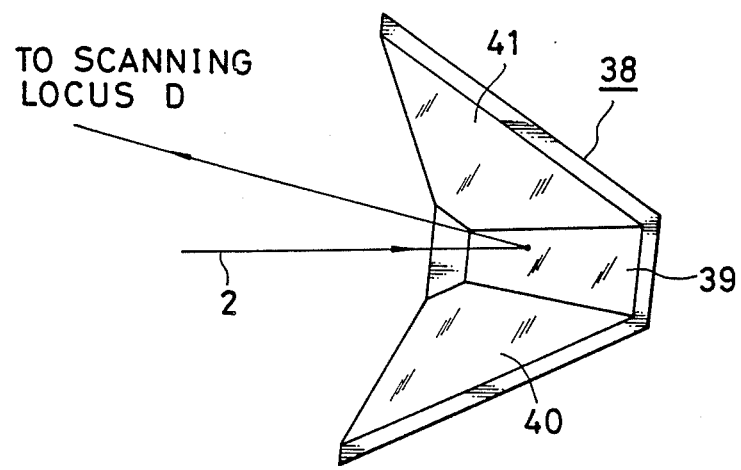

First, when the light beam 2 emitted from the light source 1 is irradiated to the reflecting surface 39 having an inclination angle of 53° as illustrated in FIGS. 16 and 17, the light beam 2 is reflected to form a scanning locus D. The scanning locus D thus formed by a single reflection is rendered parallel with the plane perpendicular to the oscillation axis T.

Figure 18:
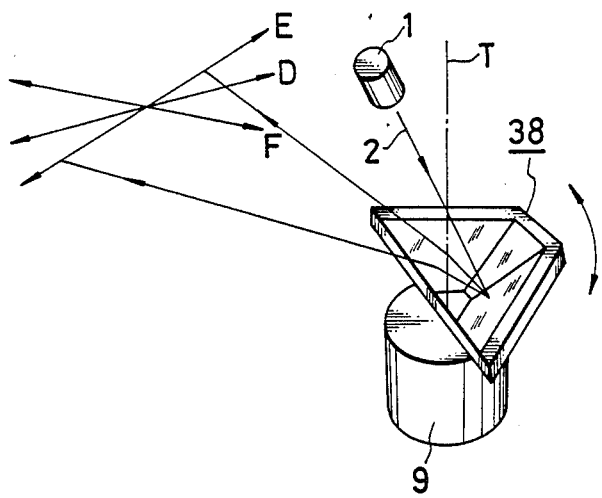
Figure 19:
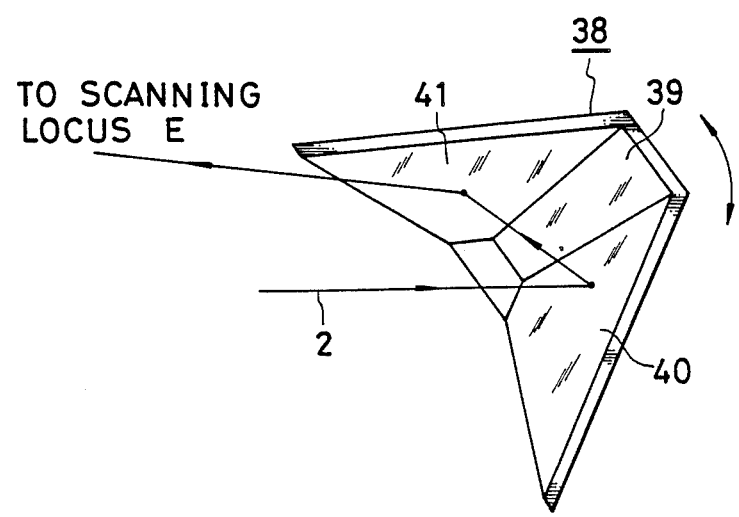

Subsequently as illustrated in FIGS. 18 and 19, when the light beam 2 is irradiated to the reflecting surface 40 having an inclination angle of 39° in accordance with the oscillation of the polyhedral reflector 38 caused on its oscillation axis T, the light beam 2 once reflected at the surface 40 is further reflected successively at the surface 41 to form a scanning locus E. The scanning locus E thus formed by two successive reflections is not parallel with the scanning locus D formed by a single reflection and is inclined to the plane perpendicular to the oscillation axis T.

Figure 20:
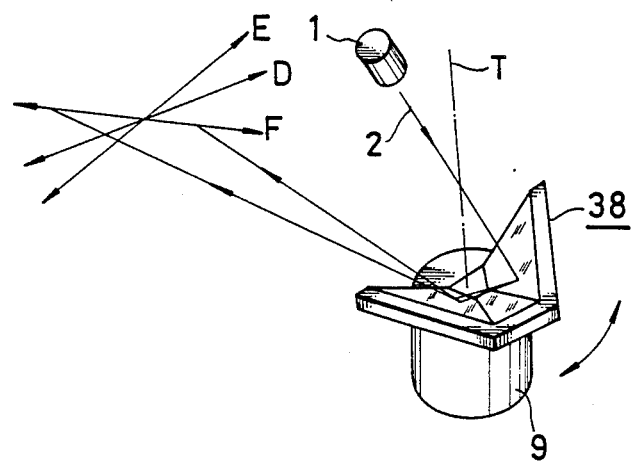
Figure 21:
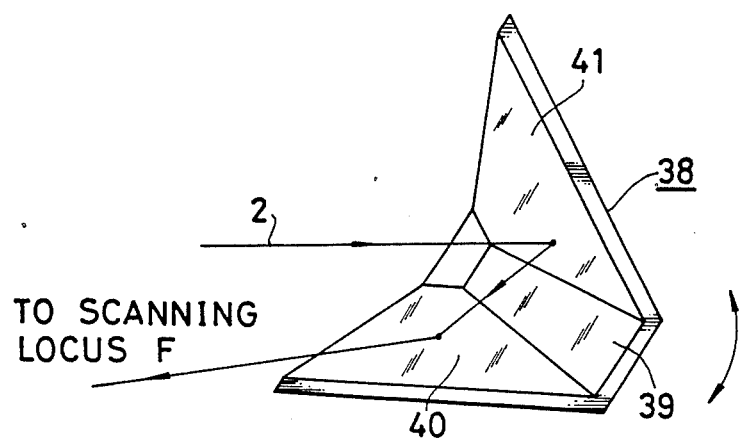
Figure 22:
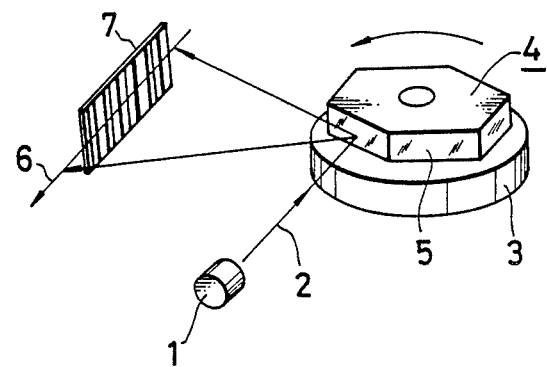
FIG. 22 is a perspective view of a first conventional example.
Figure 23:
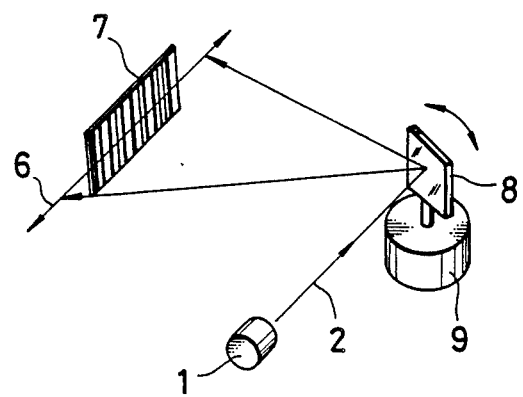
FIG. 23 is a perspective view of a second conventional example.
Figure 24:
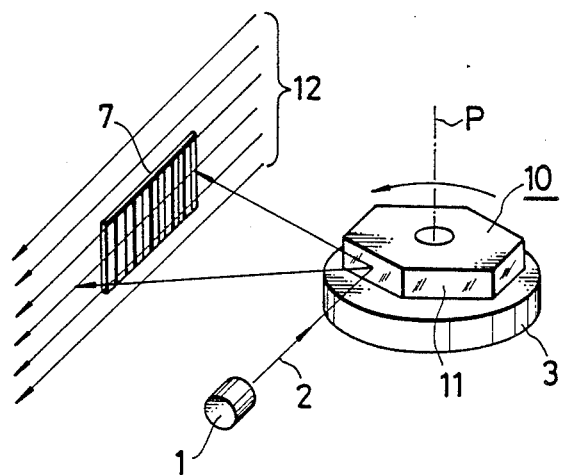
FIG. 24 is a perspective view of a third conventional example.
Figure 25:
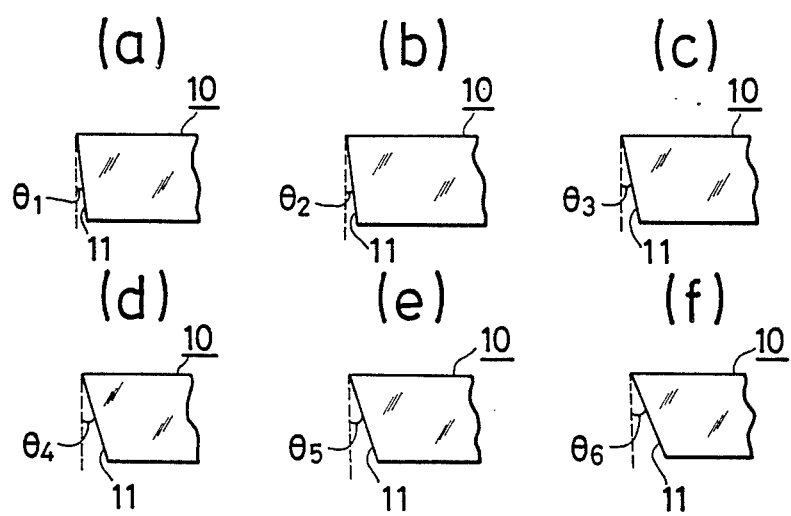
FIG. 25(a)-(f) illustrates how the shape of the reflecting surface changes in FIG. 24.
Figure 26:
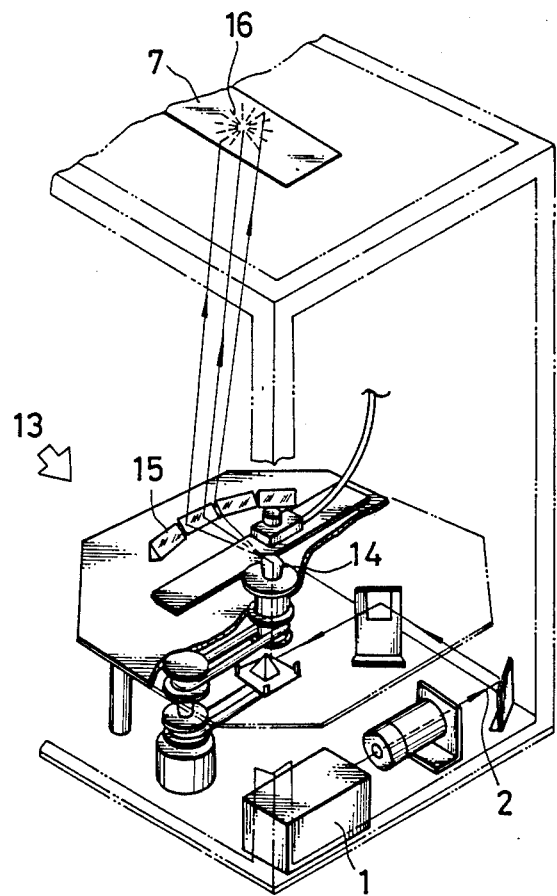
FIG. 26 is a perspective view of a fourth conventional example.

In the next stage as illustrated in FIGS. 20 and 21, when the light beam 2 is irradiated to the reflecting surface 41 having an inclination angle of 39° in accordance with the subsequent oscillation of the polyhedral reflector 38 caused on its oscillation axis T, the light beam 2 once reflected at the surface 41 is reflected again successively at the surface 40 to form a scanning locus F. The scanning locus F thus formed by two successive reflections is not parallel with the scanning locus D formed by a single reflection and is inclined to the plane perpendicular to the oscillation axis T. And in this case, the inclination of the scanning locus F becomes directionally inverse to that of the scanning locus E.

In this manner, a radial scanning locus group 43 can be formed by oscillating the polyhedral reflector 38, so that when a bar code 7 is placed at the position where such radial scanning locus group 43 is formed, it is possible to read the bar-code information with the photo sensor 26 disposed to receive the reflected light.

Therefore, if the bar code 7 is so placed as to be within the radial scanning locus group 43 formed in universal directions, the operation of reading the bar-code information can be performed simply as in the afore-mentioned rotary type first embodiment. In the first through third embodiments described above, the same components as those employed in the prior art are denoted by the same reference numerals.

In the constitution o the present invention, a polyhedral reflector including at least two correlated reflecting surfaces each formed in an angular range of 180° or less to generate a plurality of mutually non-parallel scanning loci is so disposed as to be rotatable or oscillatable on its axis, so that when a light beam emitted from a light source is irradiated to at least the two correlated reflecting surfaces each formed in an angular range of 180° or less in the rotary or oscillatory polyhedral reflector, there are generated a group of radial or meshy scanning loci in different directions by the reflected light beam. Accordingly, if a bar code is placed at the position within the scanning locus group, the bar-code information can be read simply with another advantage of eliminating the necessity of any stationary mirror group, hence accomplishing reduction of both the weight and dimensions of the whole apparatus to eventually realize a compact structure.

What is claimed is

1. A light-scanning reader wherein a polyhedral reflector comprises at least two reflecting surfaces, any two of said at least two reflecting surfaces defining an angular range of 180° or less to each other, said polyhedral reflector generating a plurality of mutually non-parallel scanning loci and being disposed so as to rotatable or oscillatable on its axis.

2. A light-scanning reader wherein a rotary polyhedral reflector has a concave shape, said rotary polyhedral reflector comprising a plurality of reflecting surfaces, each of said reflecting surfaces being inclined so as to extend to a single plane which defines the bottom of said polyhedral reflector, said polyhedral reflector generating a plurality of mutually non-parallel scanning loci.

3. The light-scanning reader according to claim 2, wherein said polyhedral reflector comprises a reflecting surface to form a scanning locus by a single reflection of a light beam emitted from a light source, and reflecting surfaces to form a scanning locus by two reflections of the light beam from the light source at the two reflecting surfaces.

4. The light-scanning reader according to claim 2, wherein reflecting surfaces having an inclination angle of 40° to the rotation axis and reflecting surfaces having an inclination angle of 55° to the rotation axis are arranged alternately, and a light beam emitted from a 5. A light-scanning reader having a polyhedral reflector, wherein said polyhedral reflector comprises a plurality of radially extending triangular projections extending from the rotation axis of said reflector, each of said triangular projections defining inclined reflecting surfaces, said polyhedral reflector generating a plurality of mutually non-parallel scanning loci.

6. A light-scanning reader comprising a concave shaped oscillatory polyhedral reflector, said polyhedral reflector comprising a plurality of reflecting surfaces, each of said reflecting surfaces being inclined so as to extend to a single plane which defines the bottom of said polyhedral reflector, wherein said polyhedral reflector is oscillatable on its axis, said polyhedral reflector generating a plurality of mutually non-parallel scanning loci.

7. The light-scanning reader according to claim 6, wherein said polyhedral reflector comprises a reflecting surface to form a scanning locus by a single reflection of a light beam emitted from a light source, and reflecting surfaces to form a scanning locus by two reflections of the light beam from the light source at the two reflecting surfaces.

8. The light-scanning reader according to claim 6, wherein said polyhedral reflector includes one reflecting surface having an inclination angle of 39° to the oscillation axis and two reflecting surfaces having an inclination angle of 53° to the oscillation axis and positioned on the two sides of said one reflecting surface, and a light beam emitted from a light source is irradiated to said reflecting surfaces at an angle of 20° with the oscillation axis.

* * * * *